RESPONSE CONTROL FOR WIDE BAND AMPLIFIERS

Filed Dec. 28, 1945

INVENTORS
ANTONY WRIGHT
& EDWIN L. CLARK
H. S. Grover
ATTORNEY

Patented July 4, 1950

2,514,112

UNITED STATES PATENT OFFICE 2,514,112

RESPONSE CONTROL FOR WIDE BAND AMPLIFIERS

Antony Wright, Drexel Hill, Pa., and Edwin L. Clark, Collingswood, N. J., assignors to Radio Corporation of America, a corporation of Delaware Application December 28, 1945, Serial No. 637,732

1 Claim. (Cl. 315—30)

The present invention relates to amplifying systems, and more particularly, although not necessarily exclusively, to response controls for wide band amplifiers such, for example, as the video amplifier in television systems and circuits.

An individual or an audience viewing a television image, especially when the image depicts a scene or group of persons, may desire a means of altering characteristics of the image to suit artistic or other ideas. This invention has for its principal aim to provide means for conveniently varying the appearance of a television image. The new result or results of controllable variation of a produced television image are attained in accordance with the invention by providing novel means for selectively changing the phase and/or frequency response characteristic of a wide band amplifier. This may be done conveniently by applying this means to a single stage of a video amplifier feeding an image producing device. A video amplifier in common with other amplifiers employed in television systems and circuits must necessarily amplify signal frequencies occupying a wide range of the frequency spectrum from the very low frequencies up to frequencies of three or four megacycles or more. The video amplifier is employed in combination with an image producing device. Special methods of response control for such an amplifier combination when applied to one or more of the amplifier stages must, when in operation, produce only desired image changes without in any way causing the image to be unsatisfactory. Recognition of a possible desire on the part of a user of television apparatus for control of the image appearance and provision of means for changing image appearance at will constitute the basis of this invention.

In addition to the principal aim or object stated above, another object of the invention is to provide an operating control which will change the frequency and/or phase characteristic of a wide band amplifier.

A further object is to provide a control for changing the characteristics of an amplifier associated with an image producing device.

A still further object of the invention is to provide an operating control which will change the phase and/or the frequency characteristic of a video amplifier to produce the effect of sharpening the image detail observed on a receiver or monitor image producing tube.

Other objects and advantages of the present invention will, of course, become apparent and immediately suggest themselves to those skilled in the art to which the invention is directed from a reading of the following specification in connection with the accompanying drawings in which.

Figures 1, 2, 3, 4, 5, 6, 7, 8:
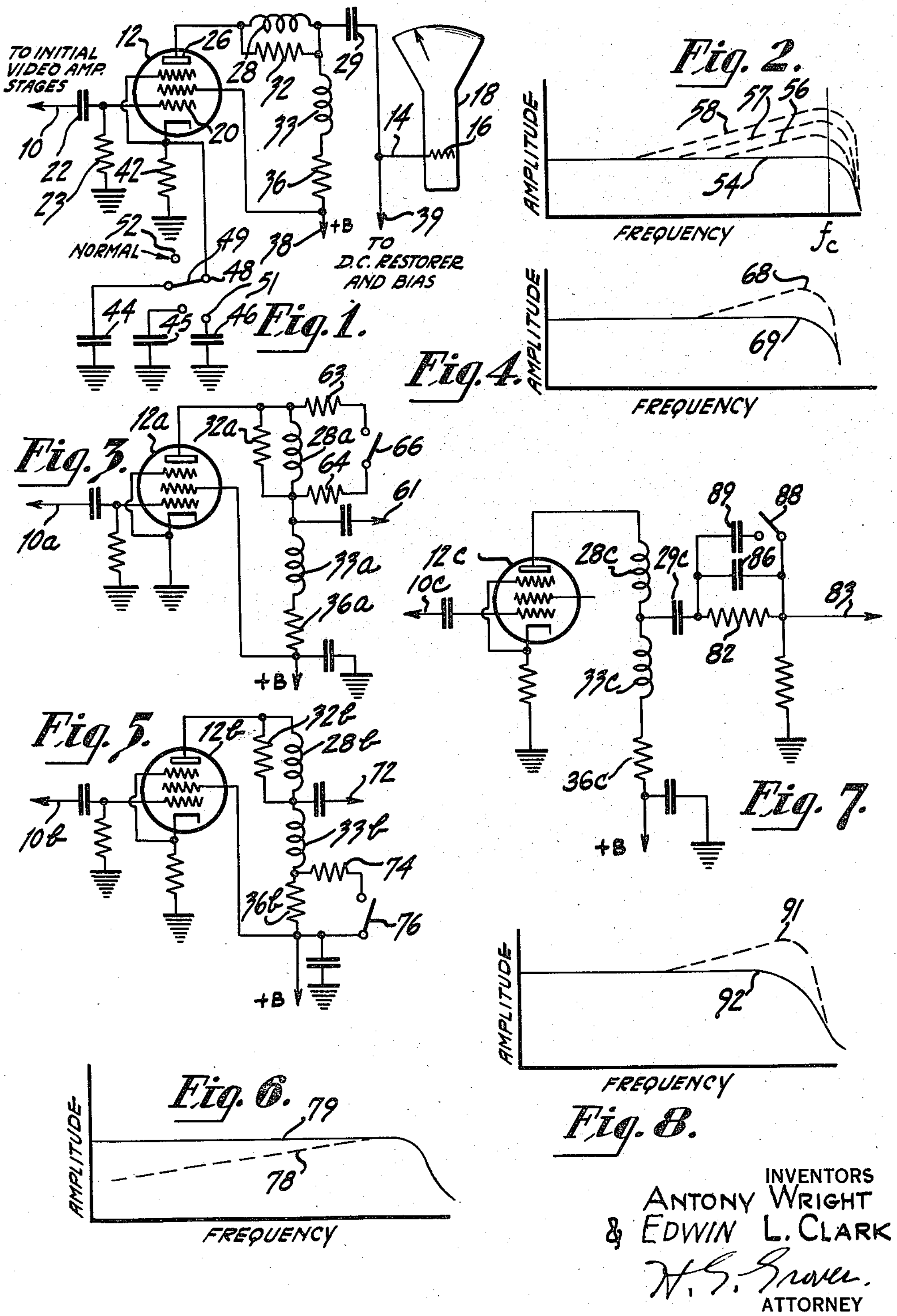
Fig. 1 shows schematically an amplifier and image tube combination arranged in accordance with the invention.
Fig. 2 shows curves serving to illustrate operation of the arrangement of Fig. 1.
Fig. 3 is a schematic showing of an amplifier stage embodying the invention in modified form.
Fig. 4 shows curves illustrating the operation of the arrangement of Fig. 3.
Fig. 5 is a schematic showing of a further modification.
Fig. 6 shows curves illustrating the operation of the modification of Fig. 5.
Fig. 7 is a schematic showing of a still further modification.
Fig. 8 shows curves illustrating the modification of Fig. 7.

Referring for the present to Fig. 1 of the drawings, 10 indicates a signal source such as a connection to the preceding stages (not shown) of a wide band amplifier (such as a viedo signal amplifier) which includes a tube 12 as an additional stage of amplification. It will be understod that the tube 12 may be the final stage of amplification in which case its output will be applied by way of a connection 14 to the grid 16 of an image producing cathode ray tube 18 shown schematically and by way of example. Other devices capable of producing a wave form pattern or a television image may be employed, in which event the output connection from the tube 12 will be made to the controlling electrode or other control means of the device which is used. The control or signal grid 20 of the tube 12 is supplied with signals from the terminal 10 which may, as stated, be connected to the output terminal of a preceding stage of amplification or to a source of image signals such as a camera tube or the like, for example. In the latter instance, the cathode ray tube 18 would serve, in general, as an image monitoring device. It will be understood that any desired coupling arrangement, such as the series and shunt peaking coil arrangements of Fig. 1, may be substituted for the simple arrangement shown which comprises a coupling condenser 22 and a grid resistor 23. An interstage coupling arrangement for an amplifier which includes series and shunt peaking inductances is disclosed in the United States patent to V. D. Landon, No. 2,173,232, granted September 19, 1939.

The plate 26 of the tube 12 is coupled to the output connection 14 through a coil 28 and a coupling condenser 29. It will be noted that the coil 28 forms, in effect a series connection between the plate 26 and the output connection 14, and this arrangement is referred to as "series peaking." The peaking coil 28 is shunted by a damping resistor 32. The plate circuit of the tube 26 also includes a coil 33 and a plate resistor 36, plate voltage being supplied from a suitable source (not shown) by way of a connection 38. Where the output connection 14 for the amplifier tube 12 is connected to the control grid of a cathode ray tube as shown in the embodiment of Fig. 1, a D. C. restorer device and a bias connection for the cathode ray tube grid 16 (neither are shown) may be associated with a connection 39. Such a D. C. restorer may, for example, be of the type shown by Ballard, U. S. Patent No. 2,240,281, granted April 29, 1941.

The response characteristic of the amplifier stage including the tube 12 is controllable in the embodiment of Fig. 1 by providing for selectively decreasing the tube degeneration. To accomplish this result, the cathode resistor 42 may operate alone or may be selectively shunted by different capacitance values. For example, capacitances 44 to 46 may be provided having increasing capacitance values, and these capacitances may be connected selectively in shunt with the resistor 42 by means of a multi-step switch 48 having a switch arm 49, movable over sweep contacts 51. An additional switch position indicated at 52 and designated "Normal" may be provided as a distinct point on the switch.

Referring to Fig. 2 of the drawings, when the switch 48 is in its normal position, the frequency-amplitude characteristic of the amplifier stage may be as indicated by reference character 54. In the next position of the switch, that is to say, with the capacitance 44 shunting the resistor 42, the characteristic may be as indicated by reference character 56. Curves 57 and 58 may indicate the frequency-amplitude characteristic of the amplifier stage when the capacitance 45 or the capacitance 46, respectively, is connected in shunt to the resistor 42. It will be understood that the curves shown in Fig. 2 of the drawings are illustrative only and suggestive of amplifier characteristics which provide pleasing results when an amplifier stage having these characteristics is connected to operate an image producing device. The effect of the change in characteristic, for example from the curve 54 to that of 56, is to alter the amplitude of response of the amplifier at the higher frequencies. The more radical changes of the amplifier characteristics, such as may be represented by the curves 56 to 58, produce an accompanying phase shift to cause the black information progressively to stand out. This accentuation of black portions of the image may be continued until the black portions stand out up to the degree of bas-relief. It appears that in practicing the invention by providing means for altering the amplitude response characteristic so as to produce a change in the phase relationship characteristic, small transients are added to the signal following an abrupt change from a signal representing a black portion of the image, for example, to a signal representing a white portion of the image. Where the change is from a black to a white signal, the following transient is white, and vice versa. This, in a measure, compensates for aperture distortion and provides better resolution in the fine detail of the image.

Fig. 3 of the drawings shows a modification in which the amplitude frequency characteristic is changed by changing the total resistance shunting the coil 28*a*. Like parts in Figs. 1 and 3 are designated by the same reference characters with the suffix "*a*." In the illustrative example in Fig. 3, a tube 12*a* may, as above stated in connection with Fig. 1, be a single stage of a wide band amplifier, the output of which is available at a connection 61. The connection 61 may correspond to the connection 14 of Fig. 1. Reference character 10*a* indicates the input connection which may receive a signal from a previous amplifier stage. A peaking coil 33*a* and a plate resistor 36*a* are provided in the plate circuit of the tube 12*a*.

The coil 28*a* is provided with a damping resistor 32*a* which may be fixed in value as shown. In accordance with this modification of the invention, a resistance comprising resistors 63 and 64 may be connected in shunt to the coil 28*a* by means of a switch 66 when it is desired to alter the characteristic of the amplifier.

The curve 68 of Fig. 4 shows the frequency-amplitude characteristic of the amplifier stage of Fig. 3 when the switch 66 is open; whereas, the curve 69 shows this characteristic of the amplifier when the switch 66 is closed, which increases the damping of the coil 28*a*. The general operation of the modification of Fig. 3 will, it is believed, be clear from the foregoing discussion of the effects obtained by Fig. 1 when the amplified characteristic is altered.

Fig. 5 of the drawings shows a further modification of the invention for altering an amplifier characteristic to obtain changes in resolution of a produced image in an image producing device. Again, reference numerals are applied to Fig. 5, which are to designate parts similar to those shown in Fig. 1, with the suffix "*b*" added. A series peaking coil 28*b* with its damping resistor 32*b* is included in the plate circuit of the tube 12*b*. The input connection 10*b* is or may be substantially unchanged, and the output connection for the amplifier stage is designated 72 and may serve in the same manner as the connection 14 of Fig. 1 or the connection 61 of Fig. 3. A shunt peaking coil 33*b* and a plate resistor 36*b* are included in the plate circuit of the tube 12*b*.

The plate resistor 36*b* is arranged to be shunted by a resistor 74 under control of a switch 76. When the switch 76 is closed, the total resistance will be decreased thereby decreasing amplification of the low frequency components of the signal applied to the connection 10*a*. For example, with the switch 76 closed, the amplifier characteristic may be somewhat as indicated by the curve 78 of Fig. 6 of the drawings. With the switch open, the characteristic may be like the curve designated 79 in Fig. 6 of the drawings. The over all amplification may be restored by altering the setting of a grain control or contrast control (neither shown) of the apparatus of which the stage of amplification shown in Fig. 5 forms a part.

Fig. 7 of the drawings shows a modified embodiment of the invention in which a tube 12*c* serves as an amplifier stage. Peaking coils 28*c* and 33*c* provide for the desired coupling response and are shown without damping means. A plate resistor 36*c* is included in the plate circuit of the tube 12*c*. A coupling condenser 29*c* and a series resistor 82 are interposed between the peaking coil combination and the output connection 83. The latter may correspond to the connection 14 of Fig. 1 and may be connected to the control grid of an image producing device or to a succeeding stage of amplification.

The resistor 82 is shunted by a capacitance 86, and a switch 88 provides for adding capacity in shunt, the added capacity being represented by the capacitance 89.

In Fig. 8, curve 91 represents the stage response with the switch 88 closed, and curve 92 represents the response with the capacitance 86 only in use. From the foregoing, it is believed that the operation of the arrangement of Fig. 7 will be understood.

Having now described the invention, what is claimed and desired to be secured by Letters Patent is the following:

In a television receiver having an image producing device, a wide band amplifier comprising an electric discharge tube having a cathode, an anode, and a control grid, means to supply image signals to said control grid, an output circuit connected to said anode comprising a series peaking coil and a shunt peaking coil, means to couple said output circuit to said image producing device, a resistor connected to said cathode and to a voltage reference point for said tube to provide a degenerative effect on the characteristic of the amplifier, a plurality of capacitors having successively increasing capacitance values, one terminal of said capacitors being connected to said voltage reference point, a selecting switch having a movable contact connected to said cathode, a plurality of successive stationary contacts for said switch, the remaining terminal of each condenser in succession of capacitance value being connected to a stationary switch contact in succession.

ANTONY WRIGHT.
EDWIN L. CLARK.

REFERENCES CITED

The following references are of record in the file of this patent:

UNITED STATES PATENTS

| Number | Name | Date |
|---|---|---|
| 2,034,226 | Carter | Mar. 17, 1936 |
| 2,101,688 | Rechnitzer | Dec. 7, 1937 |
| 2,122,990 | Poch | July 5, 1938 |
| 2,179,414 | Konkle | Nov. 7, 1939 |
| 2,189,916 | Messner | Feb. 13, 1940 |
| 2,227,197 | Percival | Dec. 31, 1940 |
| 2,240,281 | Ballard | Apr. 29, 1941 |
| 2,255,484 | Dome | Sept. 9, 1941 |
| 2,269,570 | Wilson | Jan. 13, 1942 |